March 24, 1970   KOICHI KOBAYASHI   3,502,394
LENS SYSTEM OF LARGE TELEPHOTO RATIO
Filed Sept. 21, 1967
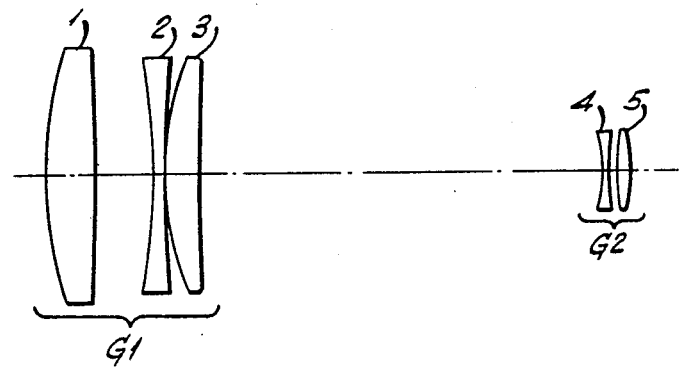
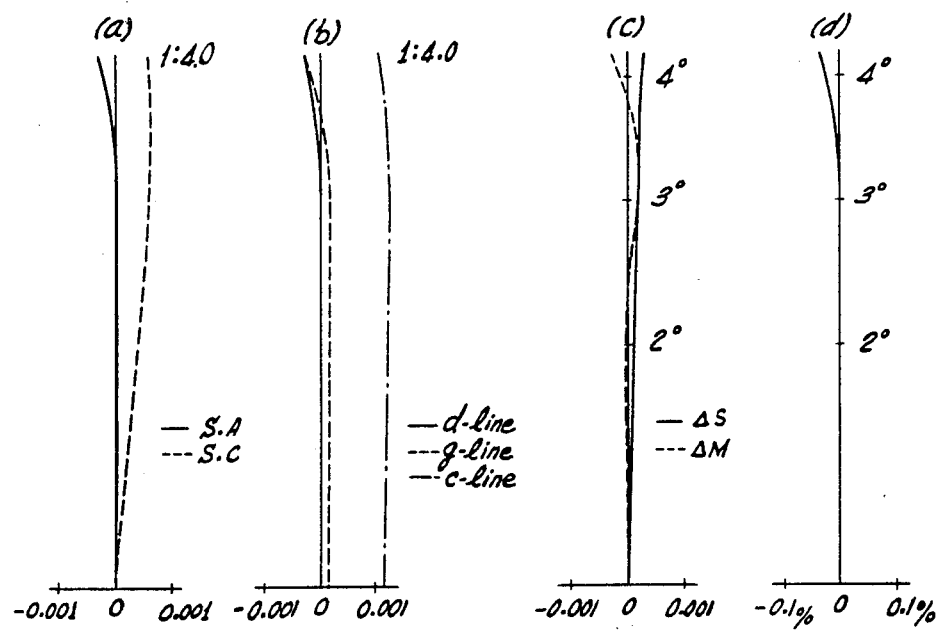
INVENTOR
KOICHI KOBAYASHI
BY Stanley Wolder
ATTORNEY

United States Patent Office 3,502,394
Patented Mar. 24, 1970

3,502,394
LENS SYSTEM OF LARGE TELEPHOTO RATIO
Koichi Kobayashi, Tokyo-to, Japan, assignor to Asahi
Kogaku Kogyo Kabushiki Kaisha, Tokyo-to, Japan, a
corporation of Japan
Filed Sept. 21, 1967, Ser. No. 669,444
Claims priority, application Japan, Sept. 26, 1966,
41/63,320
Int. Cl. G02b 9/60, 11/30, 13/02
U.S. Cl. 350—216                            1 Claim

ABSTRACT OF THE DISCLOSURE

A telephoto lens system of high telephoto ratio and in which the oblique aberration and axial aberration are well balanced comprises five lenses which are consecutively positive, negative, positive, negative and positive and satisfying the following conditions:

$$n_1, n_3 < 1.55$$

$$4F > |R_2| > 1.2F$$

$$4F > R_6 > 2F$$

$$d_2 > 0.03F$$

wherein F is the focal length of the telephoto lens system, $n_1$ and $n_3$ are the refractive indices of the first and third lenses respectively, $R_2$ and $R_6$ are the radii of curvature of the rear faces of the first and third lenses respectively, the rear face of the first lens being convex, and $d_2$ is the distance between the rear face of the first lens and the front face of the second lens, the axial aberration and the oblique aberration of said lens system being balanced in a range from the paraxial image plane to $-0.001F$ or in a positive range from the paraxial image plane.

BACKGROUND OF THE INVENTION

The present invention relates generally to improvements in lens systems and it relates particularly to an improved telephoto lens system suitable for use as a camera objective.

The conventional telephoto lens system employed as a camera objective possesses numerous drawbacks and disadvantages. The telephoto lens system of conventional design is generally of bulky and awkward construction and usually represents a compromise between size and optical quality where the telephoto ratio, that is the ratio of the telephoto lens system focal length to the distance between the front end or face of the telephoto lens system and its image plane, is large, the axial aberration and oblique aberration are poorly balanced and where a good balance of these aberrations are obtained a relatively long lens system results.

SUMMARY OF THE INVENTION

A principal object of the present invention is to provide an improved telephoto lens system.

Another object of the present invention is to provide an improved telephoto lens system for use as a camera objective.

Still another objective of the present invention is to provide an improved compact camera objective telephoto lens system.

A further object of the present invention is to provide a telephoto lens system of high telephoto ratio in which the axial aberration and oblique aberration are well balanced.

The above and other objects of the present invention will become apparent from a reading of the following description taken in conjunction with the accompanying drawing which illustrates a preferred embodiment thereof.

In accordance with the present invention there is achieved a telephoto lens system of large telephoto ratio in which oblique aberration and axial aberration are well balanced by correcting the zonal spherical aberration of the lens system in the positive range or by making the absolute value thereof very small (the absolute value of the marginal spherical aberration being made extremely small) advantage being taken of the nature of spherical aberration of a higher order.

In a sense the present invention contemplates the provision of a telephoto lens system comprising five lenses which are consecutively positive, negative, positive, negative and positive respectively and which satisfy the following conditions:

$$n_1, n_3 < 1.55$$

$$4F > |R_2| > 1.2F$$

$$4F > R_6 > 2F$$

$$d_2 > 0.03F$$

wherein F is the focal length of the telephoto lens system, $n_1$ and $n_3$ are the refractive indices of the first and third lenses respectively, $R_2$ and $R_6$ are the radii of curvature of the rear faces of the first and third lenses respectively, the rear face of the first lens being convex, and $d_2$ is the distance between the rear face of the first lens and the front face of the second lens, the axial aberration and the oblique aberration of said lens system being balanced in a range from the paraxial image plane to $-0.001F$ or in a positive range from the paraxial image plane.

The making of the refractive index of the first lens and the third lens with respect to the d-line less than 1.55 serves to prevent extreme overcorrection of the Petzval sum and also functions to hold the absolute value of the zonal spherical aberration to a small value.

The rear faces of the first and third lenses are highly effective in correcting spherical aberration of a higher order. The convex rear face of the first lens with a radius of an absolute value between 1.2F and 4F and the concave rear face of the third lens with a radius of curvature between 2F and 4F are effective for undercorrecting spherical aberration of higher order. In addition, these conditions, taking advantage of the fact that spherical aberration of higher order varies abruptly as the aperture through which the light rays pass increases, function to correct the marginal spherical aberration to a small value while keeping the zonal spherical aberration value of the entire lens system positive or keeping the absolute value thereof very small. Further, the rear face of the third lens being concave is highly effective in suitably correcting the aberration due to the oblique bundle of rays.

The condition that the distance between the first lens and the second lens exceeds 0.037F is highly advantageous in that an axial ray incident on the first lens is so refracted that the distance from the optical axis to the point of incidence thereof upon the front face of the second lens is reduced whereby to prevent overcorrection of spherical aberration.

BRIEF DESCRIPTION OF THE DRAWINGS

FIGURE 1 is a longitudinal sectional view of a telephoto lens system embodying the present invention, and FIGURE 2 represents the aberration curves thereof wherein (a) illustrates the spherical aberration and sine condition, (b) chromatic difference of spherical aberration, (c) astigmatism, and (d) distortion.

DESCRIPTION OF THE PREFERRED EMBODIMENT

Referring now to the drawing which illustrates a preferred embodiment of the present invention, the improved telephoto lens system comprises five lenses consecutively designated from the first or front lens to the fifth or rear lens as 1 to 5 respectively. The first three lenses, 1, 2 and 3 form a front group G1, each of the lenses being a separate individual lens element and the rear two lenses 4 and 5 form a rear group G2 spaced from the front group G1, the lenses 4 and 5 being separate individual lens elements.

In the first lens group G1 the first lens 1 is positive and of thickness $d_1$, index refraction $n_1$, Abbe's number $v_1$, and has a convex front face of radius of curvature $R_1$ and a convex rear face of radius of curvature $R_2$; the second lens 2 is spaced from the first lens 1 a distance $d_2$ and is negative and of thickness $d_3$, index of refraction $n_2$, Abbe's number $v_2$ and has a concave front face of radius of curvature $R_3$ and a concave rear face of radius of curvature $R_4$; and the third lens 3 is spaced from the second lens 2 a distance $d_4$ and is positive and of thickness $d_5$, index of refraction $n_3$, Abbe's number $v_3$ and has a convex front face of radius of curvature $R_5$ and a concave rear face of radius of curvature $R_6$.

In the rear lens group, the fourth lens 4 is spaced from the third lens 3 a distance $d_6$ and is negative and of thickness $d_7$, index of refraction $n_4$, Abbe's number $v_4$ and has a concave front face of radius of curvature $R_7$ and a concave rear face of radius of curvature $R_8$; and the fifth lens 5 is spaced from the fourth lens 4 a distance $d_8$ and is positive and of thickness $d_9$, index of refraction $n_5$, Abbe's number $v_5$ and has a convex front face of radius of curvature $R_9$ and a convex rear face of radius of curvature $R_{10}$.

The following Table I sets forth the dimensions and parameters of a specific example of a telephoto lens system in accordance with the present invention the lens system having a focal length F=1.0, angle of field of ±4.5°, a relative aperture of 1:4, and a telephoto ratio of 1.27.

TABLE I

| | | $n_d$ | $v$ |
|---|---|---|---|
| $R_1=0.40250$ | | | |
| | $d_1=0.044$ | $n_1=1.50977$ | $v_1=61.9$ |
| $R_2=-2.8201$ | | | |
| | $d_2=0.0535$ | | |
| $R_3=-0.74505$ | | | |
| | $d_3=0.0100$ | $n_2=1.71736$ | $v_2=29.5$ |
| $R_4=1.6033$ | | | |
| | $d_4=0.00100$ | | |
| $R_5=0.28222$ | | | |
| | $d_5=0.035$ | $n_3=1.48749$ | $v_3=70.0$ |
| $R_6=3.4511$ | | | |
| | $d_6=0.370$ | | |
| $R_7=-0.1255$ | | | |
| | $d_7=0.005$ | $n_4=1.72916$ | $v_4=54.8$ |
| $R_8=0.70126$ | | | |
| | $d_8=0.00876$ | | |
| $R_9=0.40800$ | | | |
| | $d_9=0.01$ | $n_5=1.76200$ | $v_5=40.3$ |
| $R_{10}=-0.29247$ | | | |

In the above Table I the distances between successive lenses are axially measured between the adjacent confronting faces of the respective lenses and the thicknesses of the lenses are likewise axially measured. The indices of refraction are with respect to the $d$-line.

The following Table II sets forth the Seidel coefficients of the lens system example of Table I wherein $S_1$, $S_2$, $S_3$, $p$ and $S_5$ indicate respectively the spherical aberration coefficient, coma aberration coefficient, astigmatism coefficient, Petzval condition, and distortion aberration coefficient.

TABLE II

| Surface number | $s_1$ | $s_2$ | $s_3$ | P | $s_5$ |
|---|---|---|---|---|---|
| 1 | 3.429 | 1.380 | 0.555 | 0.838 | 0.561 |
| 2 | 2.706 | -1.495 | 0.825 | 0.119 | -0.522 |
| 3 | -7.606 | 2.557 | -0.859 | -0.560 | 0.477 |
| 4 | 0.000 | -0.002 | -0.007 | -0.260 | -0.877 |
| 5 | 4.430 | 2.161 | 1.054 | 1.161 | 1.081 |
| 6 | 1.268 | -0.943 | 0.701 | -0.094 | -0.451 |
| 7 | -5.028 | -3.906 | -3.034 | -3.360 | -4.967 |
| 8 | -0.009 | -0.097 | -1.006 | -0.601 | -16.590 |
| 9 | 0.031 | 0.236 | 1.765 | 1.059 | 21.135 |
| 10 | 0.759 | -0.001 | 0.000 | 1.478 | -0.003 |
| SUM | -0.018 | -0.111 | -0.004 | -0.219 | -0.156 |

The following Table III sets forth the spherical abberation coefficients of higher order $a_3$, $a_5$, $a_7$ and $a_9$ indicating the coefficients of the third, fifth, seventh and ninth order respectively.

TABLE III

| Surface number | $a_3$ | $a_5$ | $a_7$ | $a_9$ |
|---|---|---|---|---|
| 1 | 1.7148 | 6.1634 | 23.847 | 117.7 |
| 2 | 1.3534 | 10.3781 | 73.351 | 502.8 |
| 3 | -3.8032 | -27.4495 | -194.668 | -1372.7 |
| 4 | -0.0004 | -0.0041 | -0.132 | -3.1 |
| 5 | 2.2151 | 22.0118 | 248.734 | 2863.4 |
| 6 | 0.6343 | 8.0311 | 96.548 | 1254.5 |
| 7 | -2.5142 | -20.0919 | -168.949 | -1165.9 |
| 8 | -0.0047 | -0.0574 | -0.399 | 10.0 |
| 9 | 0.0158 | 0.1397 | 0.773 | -25.6 |
| 10 | 0.3798 | 0.7310 | -0.186 | -2.3 |
| SUM | -0.0092 | -0.1476 | 80.919 | 2183.5 |

The aberration curves of the specific telephoto lens system are illustrated in FIGURE 2 of the drawing which demonstrate the high optical quality of the improved lens system which is simple, compact and of high telephoto ratio.

While there has been described an illustrated a preferred embodiment of the present invention it is apparent that numerous alterations may be made without departing from the spirit thereof:

What is claimed is:
1. A telephoto lens system comprising five consecutively designated lenses having ten lens faces consecutively designated as the first to the tenth lens face from the front face of the first lens to the rear face of the fifth lens and possessing the following dimensions and relationships:

| | | $n_d$ | $v$ |
|---|---|---|---|
| $R_1=0.40250$ | | | |
| | $d_1=0.044$ | $n_1=1.50977$ | $v_1=61.9$ |
| $R_2=-2.8201$ | | | |
| | $d_2=0.0535$ | | |
| $R_3=0.74505$ | | | |
| | $d_3=0.0100$ | $n_2=1.71736$ | $v_2=29.5$ |
| $R_4=1.6033$ | | | |
| | $d_4=0.00100$ | | |
| $R_5=0.28222$ | | | |
| | $d_5=0.035$ | $n_3=1.48749$ | $v_3=70.0$ |
| $R_6=3.4511$ | | | |
| | $d_6=0.370$ | | |
| $R_7=-0.1255$ | | | |
| | $d_7=0.005$ | $n_4=1.72916$ | $v_4=54.8$ |
| $R_8=0.70126$ | | | |
| | $d_8=0.00876$ | | |
| $R_9=0.40800$ | | | |
| | $d_9=0.01$ | $n_5=1.76200$ | $v_5=40.3$ |
| $R_{10}=-0.29247$ | | | | wherein $R_i$ is the radius of the curvature of the $i$th lens face, $d_i$ is the axial distance between the $i$th lens face and the next successive lens face, $n_n$ is the index of refraction of the $n$th lens and $v_n$ is Abbe's number of the $n$th lens.

References Cited
UNITED STATES PATENTS 2,576,436  11/1951  Baker _____ 350—216 X
3,115,538  12/1963  Ruben et al. _____ 350—216

JOHN K. CORBIN, Primary Examiner